UNITED STATES PATENT OFFICE.

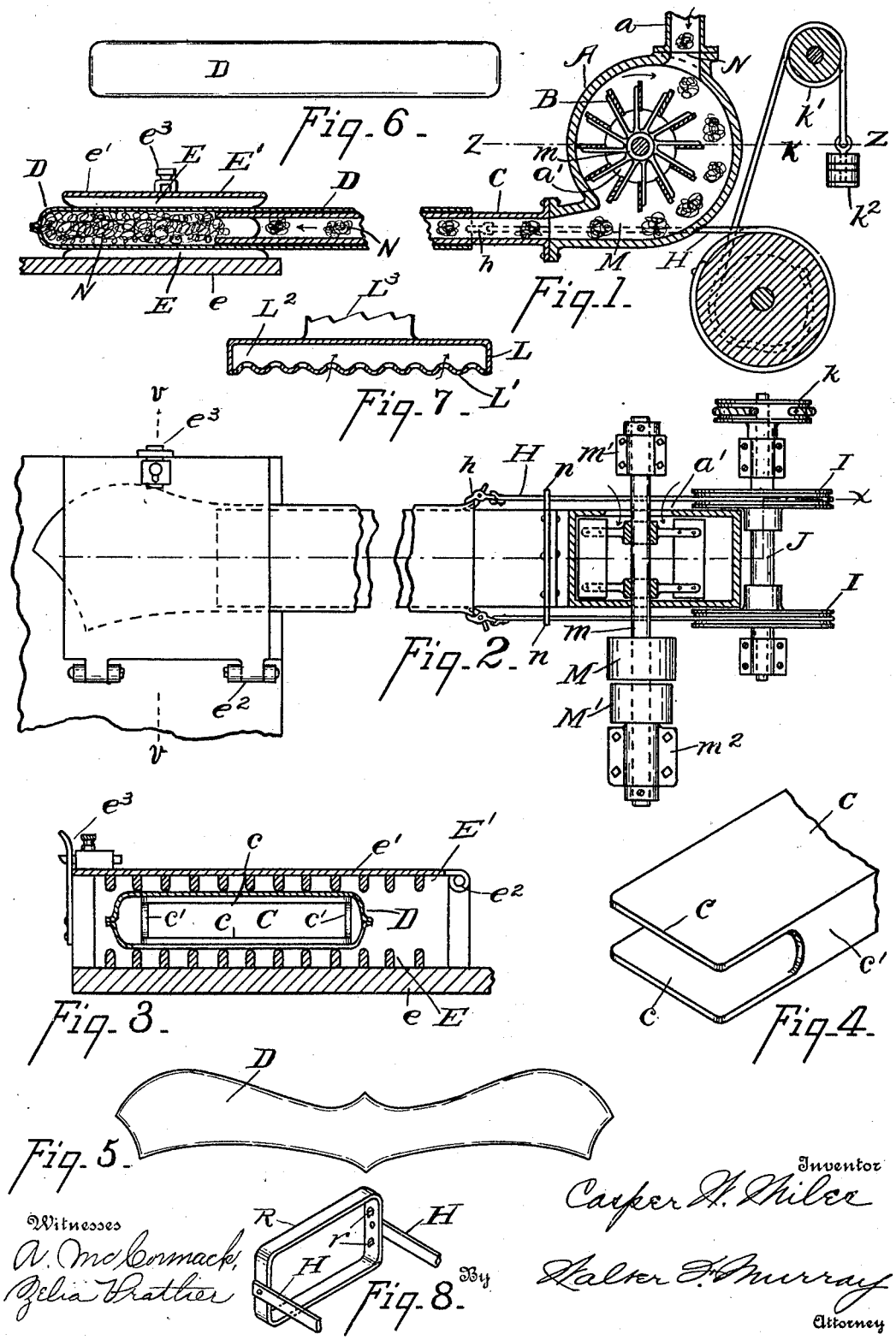

CASPER W. MILES, OF MOUNT WASHINGTON, OHIO, ASSIGNOR TO THE AMERICAN PAD & TEXTILE COMPANY, OF GREENFIELD, OHIO, A CORPORATION OF OHIO.

PAD-STUFFING MACHINE.

953,174.      Specification of Letters Patent.      Patented Mar. 29, 1910.

Application filed July 29, 1908. Serial No. 445,881.

*To all whom it may concern:*

Be it known that I, CASPER W. MILES, a citizen of the United States of America, and resident of Mount Washington, county of Hamilton, State of Ohio, have invented certain new and useful Improvements in Pad-Stuffing Machines, of which the following is a specification.

My invention relates to improvements in pad stuffing machinery.

One of its objects is to provide mechanism which will stuff the pads uniformly, and avoid stuffing them harder at one point than at another.

Other objects are to provide improved mechanism for feeding the stuffing material into the pad casing, improved tension mechanism to hold and feed the pad casing during the stuffing operation, improved mechanism to shape the pads during the stuffing operation and improved means for stuffing and shaping pads of varying widths at different parts of their length.

It further consists in certain details of form, combination and arrangement, all of which will be more fully set forth in the description of the accompanying drawings, in which—

Figure 1 is a central longitudinal section through my improved mechanism on line $x$—$x$ of Fig. 2, and showing the tension wheels also in section. Fig. 2 is a horizontal sectional view on line $z$—$z$ of Fig. 1. Fig. 3 is an enlarged sectional view on line $v$—$v$ of Fig. 2. Fig. 4 is a perspective view of the free end of the stuffing tube. Fig. 5 is a plan view of one form of pad. Fig. 6 is a plan view of another form of pad. Fig. 7 is a cross sectional view through a modified form of pad shaping mechanism. Fig. 8 is a perspective view of modified means for attaching the tension device to the pad casing.

I have illustrated one form of my improved mechanism for stuffing pads in the accompanying drawings in which, A, represents a blower casing, B, a fan or blower revolving therein, and C a stuffing tube having a cross-sectional outline to correspond with the shape of the pad to be stuffed. The stuffing tube is attached to the outlet end of the blower casing, and the air current formed by the blower carries the stuffing material from the supply pipe, $a$, through the blower casing and stuffing tube and presses the stuffing uniformly and evenly into the textile pad casing, D, the air escaping through the pad casing.

In order to hold the pad casing to the outline desired in the finished pad during the stuffing operation, I provide a series of ribs, E, upon the table, $e$, which ribs are arranged lengthwise in the direction of the travel of the pad during the stuffing operation. These ribs serve to support the pad, to retain it in the desired shape, and to permit the escape of air between them. A similar set of ribs, E', are arranged above the pad, and carried by a plate, $e'$, which plate is hinged at, $e^2$, to the table. Its free end is adapted to be held in place by a spring latch, $e^3$, during the stuffing operation. The ribs, E, E', thus confine the pad casing at the point where the stuffing operation is taking place, to the outline of pad desired, and permit the pad to feed forward lengthwise of said ribs as the parts of the pad become stuffed. Where the pads are to be of uniform width as indicated in Fig. 6, the form of the end of the stuffing tube is not important and may terminate with the four faces of equal length. Where, however, the pad varies in width, as indicated in Fig. 5, the top and bottom sections of the stuffing tube are preferably projected beyond the side sections, $c'$, as indicated in Fig. 4, thus permitting the stuffing to escape from the tube, C, at the sides in advance of the end, and thus to uniformly stuff varying widths of the pad.

In order to regulate the pressure of the stuffing and the feeding of the pad from the stuffing tube I provide cords or tapes, H, carrying metal clips, $h$, which are attached to the open mouth of the pad casing to strain the casing over the stuffing tube, the opposite ends of said tapes being attached to and wound upon drums, I, carried by shaft, J. A cord, or tape, K, attached to and wound upon a drum, $k$, on shaft, J, passes thence over a roller, $k'$, and is provided with a tray, $k^2$, upon which may be arranged the desired weight to secure the required tension through tapes, H, upon the pad casing. Where pads of irregular outline, such as shown in Fig. 5, are to be stuffed, the drum, $k$, may be of irregular outline, or cam-shaped, so as to vary the tension effect of the weights at different portions of the pad to secure a uniform stuffing effect in wide and narrow parts of the pad, or if desired, to stuff the pad harder at one point than at others.

In Fig. 7 I have shown a modification of the guide for supporting and shaping the exterior of the pad during the stuffing operation, which comprises sheet metal boxes, L, to be located above and below the pad, the corrugated faces, L', to take the place of the ribs, E, E'. The air and any dust ejected from the pad passes through the perforations $L^2$, into the interior of the boxes, L, and may thence be carried through tube, $L^3$, to an aspirator. For instance, the tube, $L^3$, might be connected to the blower, B. M, M', represent tight and loose pulleys on the shaft, $m$, of the blower, which shaft is supported in journals, $m'$, $m^2$. N represents the stuffing material, which may be wool, cotton, curled hair, or like material. The pad casing, D, in the form of a sack of flexible material, open at one end, is drawn over the stuffing tube until its closed end is adjacent to the end of the tube. The clips, $h$, which when not in use rest against the guide bracket, $n$, are drawn forward and attached to the edges of the open mouth of the casing, and hold the casing in place on the tube. The plate, $e'$, being latched in position and the blower started, the stuffing material is accumulated at the closed end of the pad casing, and as the stuffing tends to stop up the exit end of the stuffing tube, the tension yields and the pad casing feeds forward between the ribs until the pad is completely stuffed. The blower is stopped then and another casing adjusted to position. The stuffing tube is shaped to correspond in cross section to the shape of pad desired and the ribs, E, E', or boxes, L, serve to retain the pad in the desired form while being stuffed. The air blast carries the stuffing material uniformly, and with uniform pressure to all parts of the interior of the pad, thus producing a pad uniformly stuffed at one operation.

In Fig. 8 I have shown an elastic band, R, adapted to be adjusted to encircle the open end of the pad casing and to hold it upon the stuffing tube, said band being preferably provided with inwardly projecting tangs, $r$, to lock the band to the pad casing. The band, R, is designed to be used as a substitute for the clips, $h$, and to be attached to the tapes, H, in order to tension the pad casing.

The blower casing may be provided with an air intake, $a'$, or if desired, the air intake may be through the stuffing intake tube, $a$.

The mechanism herein illustrated and described is capable of considerable modification without departing from the principle of my invention.

Having described my invention, what I claim is:

1. In a mechanism of the character indicated, a stuffing tube shaped substantially to the cross-sectional outline required in the finished pad, a means of forcing an air blast and of feeding stuffing material through said tube into the pad casing, means for yieldingly holding the pad casing upon said tube, and guides bearing upon the exterior of the pad casing at the point where the stuffing is being introduced into the casing, to shape the pad.

2. In a mechanism of the character indicated, a stuffing tube shaped substantially to the cross-sectional outline required in the finished pad, a means of forcing an air blast through said tube to feed the stuffing material through said tube into the pad casing, means for yieldingly holding the pad casing upon said tube with a variable tension, and guides bearing upon the exterior of the pad casing at the point where the stuffing is being introduced into the casing to shape the pad.

3. In a mechanism of the character indicated, a stuffing tube shaped substantially to the cross-sectional outline required in the finished pad, a means of forcing an air blast through said tube to feed the stuffing material through said tube into the pad casing, hollow guides bearing upon the exterior of the pad casing at the point where the stuffing is being introduced into the casing, perforations in the guides for the passage of air into the interior of said hollow guides, and offtake pipes leading from said guides.

4. In a pad stuffing machine the combination of a stuffing tube, a guide box normally surrounding the discharge end of the stuffing tube and adapted to be moved to permit access to the end of the tube, guide ribs upon the interior of the guide box in alinement with the stuffing tube, means for holding a pad to be stuffed yieldingly upon the stuffing tube, and a means of forcing an air blast through the stuffing tube.

CASPER W. MILES.

Witnesses:
WALTER F. MURRAY,
AGNES MCCORMACK.